US005899314A

United States Patent [19]

Kwon

[11] Patent Number: 5,899,314

[45] Date of Patent: May 4, 1999

[54] TERMINAL RAIL FOR PASSENGER CONVEYOR

[75] Inventor: Yi Sug Kwon, Changwon, Rep. of Korea

[73] Assignee: LG Industrial Systems Co., Ltd., Seoul, Rep. of Korea

[21] Appl. No.: 08/956,019

[22] Filed: Oct. 22, 1997

[30] Foreign Application Priority Data

Oct. 22, 1996 [KR] Rep. of Korea ...................... 96-47430

[51] Int. Cl.[6] .................................................... B65G 23/12

[52] U.S. Cl. ........................... 198/332; 198/326; 198/327

[58] Field of Search .................................... 198/326, 327, 198/332

[56] References Cited

U.S. PATENT DOCUMENTS 951,744 3/1910 Seeberger ................................ 198/326
3,834,513 9/1974 Miura et al. ............................ 198/332
4,130,192 12/1978 Kraft ....................................... 198/327
5,161,668 11/1992 Datema et al. ......................... 198/332
5,170,875 12/1992 Kubota .................................... 198/328
5,224,580 7/1993 Nurnberg et al. ...................... 198/330

FOREIGN PATENT DOCUMENTS 436618 11/1967 Switzerland ........................... 198/326

*Primary Examiner*—James R. Bidwell

[57] ABSTRACT

A terminal rail for a passenger conveyor including an inner and outer guide rails is disclosed. According to the terminal rail, a portion on which the rear wheel roller is initially contacted with the outer guide rail includes a damper placed between an end of a straight portion of the outer guide rail and a desired position of a turning portion to damp impact produced when the rear wheel roller of the step travels from the inner guide rail to the outer guide rail of the terminal rail.

4 Claims, 6 Drawing Sheets

TERMINAL RAIL FOR PASSENGER CONVEYOR

BACKGROUND OF THE INVENTION

1. Field of the Invention

The present invention relates generally to a passenger conveyor such as an escalator, and more particularly to a terminal rail for a passenger conveyor capable of reducing noises and vibrations generated due to the impact produced from the terminal rail during its operation.

2. Description of Related Art

A passenger conveyor typically includes a series of passenger platforms which are driven in an endless path between horizontally spaced landings. The most common types of passenger conveyors are escalators and horizontal walkways. In case of the escalator, the platforms are steps which are driven between an upper landing and a lower landing to facilitate the conveyance of passengers, cargo, and the like. The passenger conveyor also includes hand rails which are movable along and supported by opposite sides of a main frame of the conveyor.

The passenger platforms are normally connected in a circle by a pair of drive chains which extend along opposite sides of the passenger conveyor and which engage a powered sprocket assembly mounted on at least one end of the conveyor to effect continuous movement of the steps between the upper and lower landings. The steps extend laterally across the conveyor between the opposite sides of the main frame to define a step band that is a spatial envelope between the upper and lower landings and between the opposite handrails through which the steps travel. The steps, which convey passengers toward an off-load landing, travel above the sprocket assembly to define an upper step band, while the inverted steps which return to the on-load landing, travel below the sprocket assembly to define a lower band.

Conventional passenger conveyors as described above are disclosed in, for example, U.S. Pat. No. 5,161,668 issued to Datema et al. on Oct. 10, 1992, U.S. Pat. No. 5,170,875 issued to Kubota on Dec. 15, 1992, and U.S. Pat. No. 5,224,580 issued to Nurnberg et al. on Jul. 6, 1993.

Meanwhile, another conventional passenger conveyor is illustrated in FIGS. 1 to 4. Referring to FIGS. 1 and 2, the conventional passenger conveyor comprises a pair of horizontally spaced circulating hand rails 1, a plurality of steps 2 which passengers get on and off, and a transmission system 3 for driving the handrails 1 and the steps 2. The transmission system 3 generally includes a motor 4 for driving the steps 2, a reduction gear for transferring the driving force between the motor and a drive sprocket 7, and drive chains 6 operatively engaged with the drive sprocket 7.

In the above passenger conveyor, the drive sprocket 7, a drive terminal gear 8, a drive shaft 12 and a terminal rail 13 constitute a drive system. And, the steps 9, endless step chains 10, and front and back wheels 14 and 15 which are engaged to the steps 9 constitute a moving system.

FIG. 3 is a perspective view of the terminal rail 13 having inner and outer guide rails 18 and 19, and FIG. 4 is a view illustrating an engaged state of the terminal rail 13, wherein the end of the inner guide rail 18 is engaged to a secondary rail 17.

Such a conventional terminal rail 13 performs only the role of guiding the back wheel 15 of the step 9. The terminal rail is provided with no special device or method to eliminate or constrain noises or vibrations. However, a method for accurately machining the inner and outer guide rails 18 and 19 of the terminal rail 13 along which the back wheel 15 of the step travels to reduce the clearance between them as small as possible, and to relieve the impact is mainly adopted. For instance, the Kubota patent discloses an expansion/contraction joint mechanism For adjusting the length of the guide rail.

When the electric power is supplied to the passenger conveyor as constructed above, the driving force produced from the motor 4 which is disposed in the transmission system 3 is transferred to a speed reducer 5. The driving force produced from the speed reducer 5 is transferred to the drive sprocket 7 through the drive chains 6. Accordingly, the drive terminal gear 8 engaged on the same axis of the drive sprocket 7 drives the step chains 10 connected with the steps 9, so that the steps 9 continuously move along the drive and driven terminal gears 8 and 11.

At that time, the front wheel roller 14 of the step moves along a primary rail 16, and the rear wheel roller 15 moves straight along the secondary 17 and turns along the terminal rail 13 on the upper and lower portions of the conveyor.

In particular, on the upper and lower portions of the conveyor, the front wheel roller 14 of the step rotates along the periphery of the terminal gear 8, and the rear wheel roller 15 of the step rotates along the turning section of the terminal rail 13 as shown in FIG. 4. At that time, the rear wheel roller 15 of the step 9 moves along the inner guide rail 18, and rotates along the inside of the outer guide rail 19.

When the conventional passenger conveyor with the terminal rail 13 engaged as described above operates, noises and vibrations are greatly produced due to the impact occurring near the terminal rail 13 positioned on the upper and lower portions of the conveyor.

The noises and vibrations caused by the impact have been the chronic and inherent problem of the conventional conveyor in spite of continuous efforts to solve it.

In order to examine all possible factors of the above noises and vibrations, the noise measuring test was carried out by using so-called Taguji method.

FIG. 5 is a graph showing the influence of each noise factor obtained by using the Taguji method. Referring to FIG. 5, it appears that as the inclination becomes greater, the influence of the factor for retaining the noises also becomes greater.

The testing result has revealed that the source of the noises and vibrations at the upper and lower turning sections of the conveyor is the terminal rail 13. Meanwhile, a factor "C" has been proved to have merely the relation to the increase/decrease of the noises and vibrations produced from the terminal rail.

In order to examine the mechanism of the noises and vibrations produced by the terminal rail 13 and the impact position therein, a red lead has been used. The rear wheel roller 15 of the step travels on the inner guide rail 18 of the terminal rail 13 through the trace on the terminal rail as shown in FIG. 6 and deviates from a turning section B. At the same time, the roller 15 strikes against a section A (the position at about 45 degrees counter-clockwise to the straight line of the inner guide rail of the terminal rail 13), and rotates along the inside of the inner guide rail 19 of the terminal rail 13.

The reason why the roller is not abutted against the inside of the outer guide rail 19 corresponding to the straight line of the inner guide rail 18, but rises toward the section A and impacts thereto is that the steps 9 are operated by the terminal gear 8. In view of the test results induced from the trace of the existing terminal rail 13, it has been confirmed that the outer guide rail 19 of the terminal rail 13 is applied with a lot of pressure and impact.

The trace of the rear wheel roller 15 of the step during turning is always constant, and thus the rear wheel roller 15 of the step impacts against the section A of the terminal rail 13, thereby producing the noises and vibrations; that is to say, 1. Every time the rear wheel roller 15 of the step impacts against the section A, the noises are significantly produced.
2. Every time the rear wheel roller 15 of the step impacts against the section (0.8 seconds per step), the vibrations of the step 9 are increased by an increasing of the pulsating phenomenon.
3. Since the rear wheel 15 of the step impacts directly upon the terminal rail 13, the life of these components is shortened.
4. In case of the outer guide rail 19 of the terminal rail 13 having an interior surface with a coarse finish, the impact noises are increased.

In the structure of the conventional terminal rail, the dimensional clearance of the terminal rail 13 has to be maintained very precisely to reduce the noises and vibrations produced due to the above reason 1, thereby rising the cost and deteriorating the productivity thereof.

SUMMARY OF THE INVENTION

In order to overcome the drawbacks as described above, an object of the present invention is to provide a terminal rail for a passenger conveyor, such as an escalator, moving walk, or the like, which can prevent noises and vibrations from being produced due to the impact of a rear wheel roller of a step.

Another object of the present invention is to provide a terminal rail for a passenger conveyor capable of restraining vibrations of a step produced by the impact of a rear wheel roller of the step.

Still another object of the present invention is to provide a terminal rail for a passenger conveyor capable of extending the life of a rear wheel roller of a step and a rail terminal.

Still another object of the present invention is to provide a terminal rail for a passenger conveyor capable of reducing the manufacturing cost and improving its productivity.

According to one aspect of the present invention, to achieve the above objects, there is provided a terminal rail for a passenger conveyor including a rail formed in a straight-line, for guiding a front wheel roller of a step, and a terminal rail having inner and outer guide rails for guiding a rear wheel of the step, characterized in that a portion on which the rear wheel roller is initially contacted with the outer guide rail is provided with damping means placed between an end of a straight portion of the outer guide rail and a desired position of a turning portion to damp impact produced when the rear wheel roller of the step travels from the inner guide rail to the outer guide rail of the terminal rail.

Preferably, damping means is a leaf spring.

BRIEF DESCRIPTION OF THE DRAWINGS

The above objects, other aspects, and advantages of the invention will become apparent by describing the preferred embodiment thereof with reference to the accompanying drawings, in which.

DETAILED DESCRIPTION OF THE PREFERRED EMBODIMENT

Figure 1:
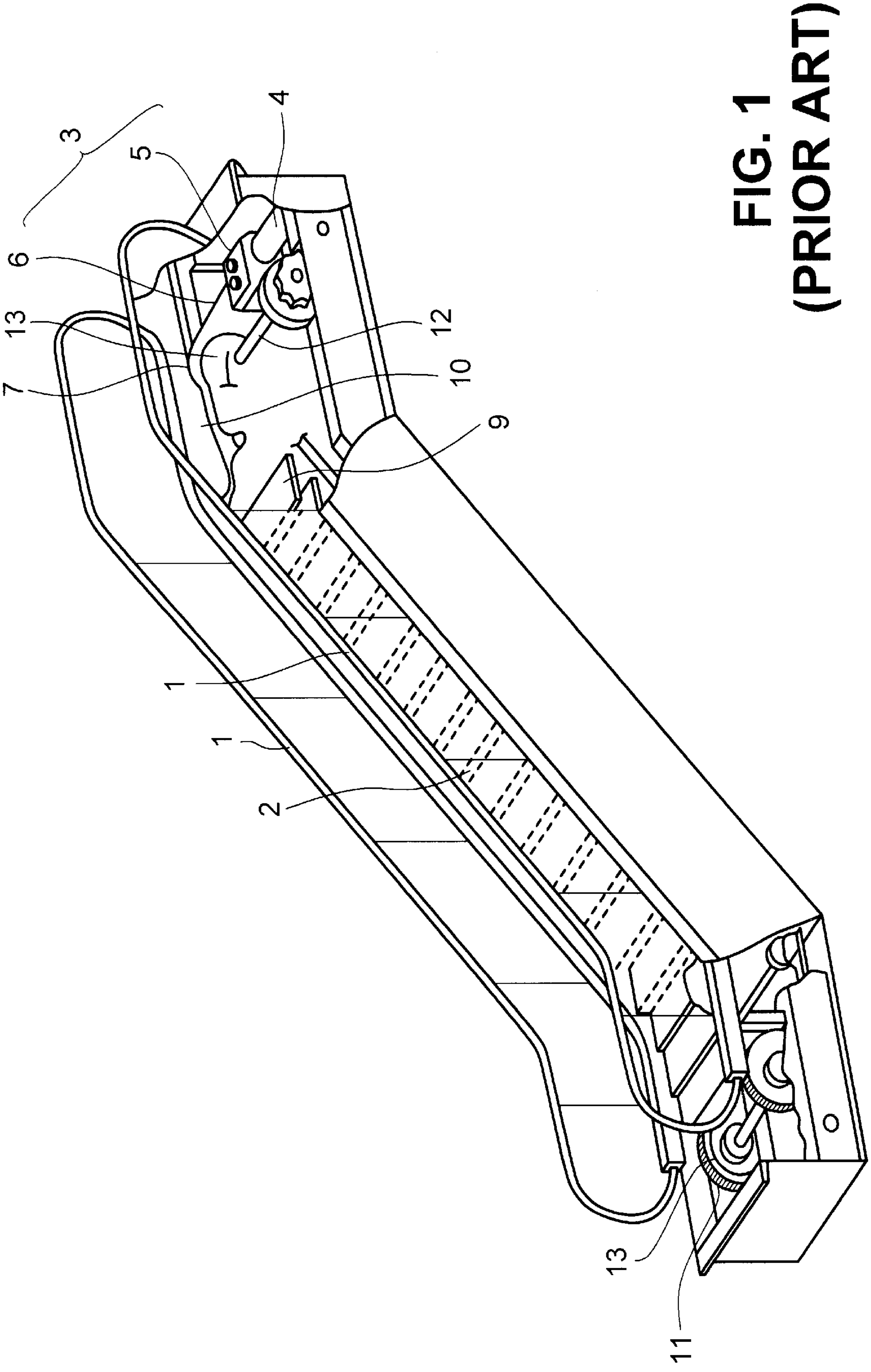
FIG. 1 (PRIOR ART)
FIG. 1 is a partially cutaway view in perspective of the structure of a conventional passenger conveyor.
Figure 2:
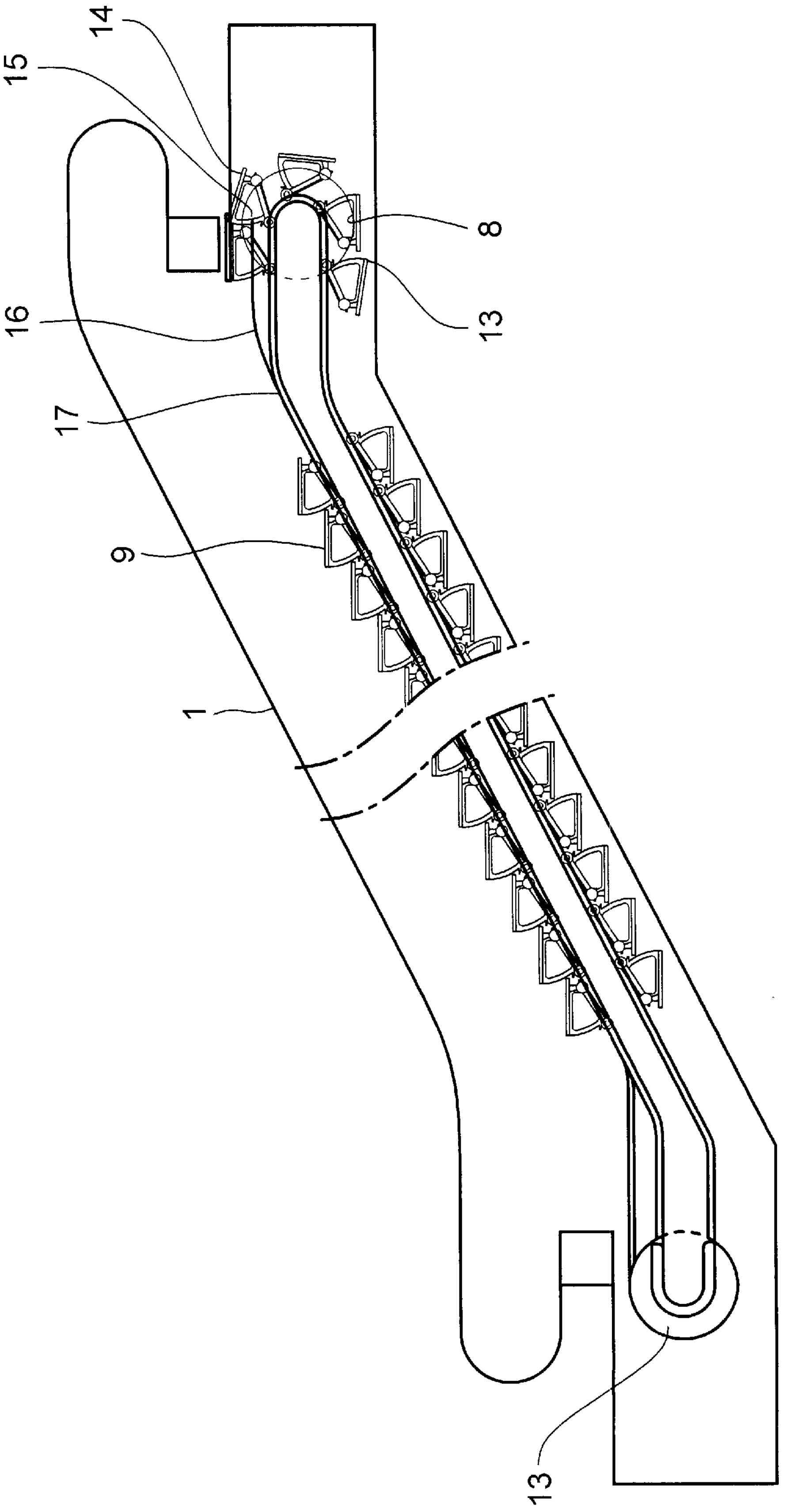
FIG. 2 (PRIOR ART)
FIG. 2 is a side view of FIG. 1.
Figure 3:
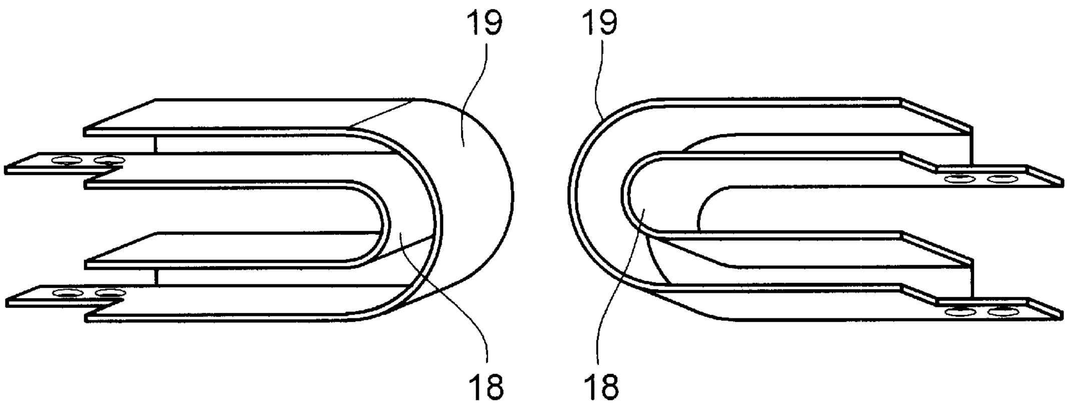
FIG. 3 (PRIOR ART)
FIG. 3 is a perspective view showing the structure of a terminal rail for the conventional passenger conveyor.
Figure 4:
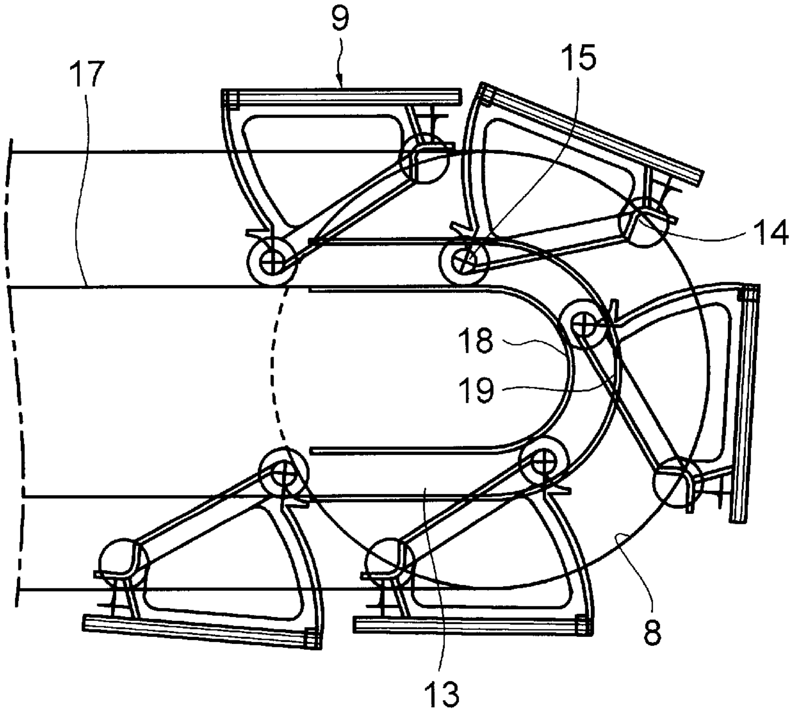
FIG. 4 (PRIOR ART)
FIG. 4 is a side view showing the engaging state of the terminal rail for the conventional passenger conveyor.
Figure 5:
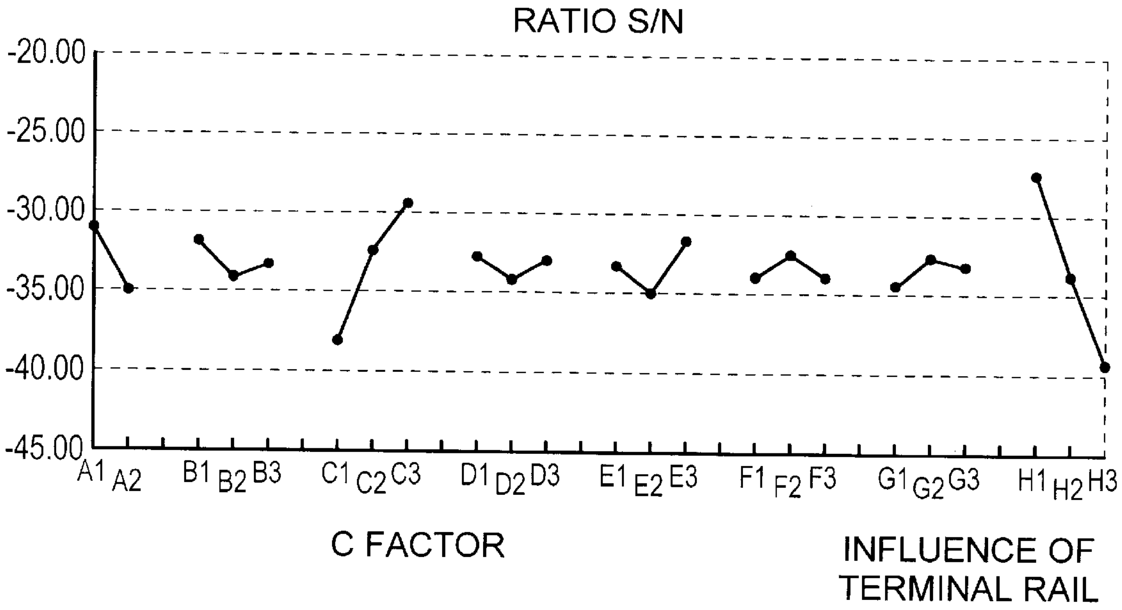
FIG. 5 (PRIOR ART)
FIG. 5 is a graph indicating the test results of a ratio S/N by using so-called Taguji method in order to examine the influence of the noise factors of the conventional passenger conveyor.
Figure 6:
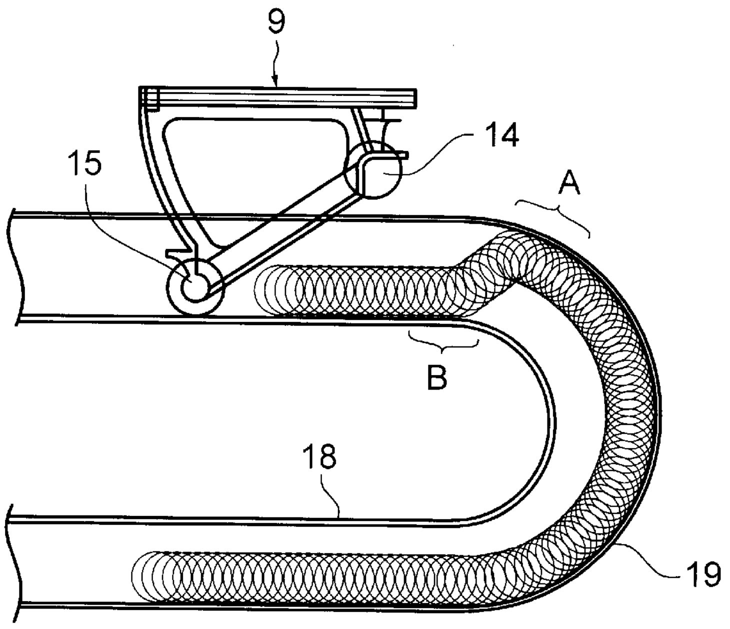
FIG. 6 is a view showing the path of a rear wheel roller of a step on a terminal rail when operating of the passenger conveyor incorporated with the conventional terminal rail.
Figure 7:
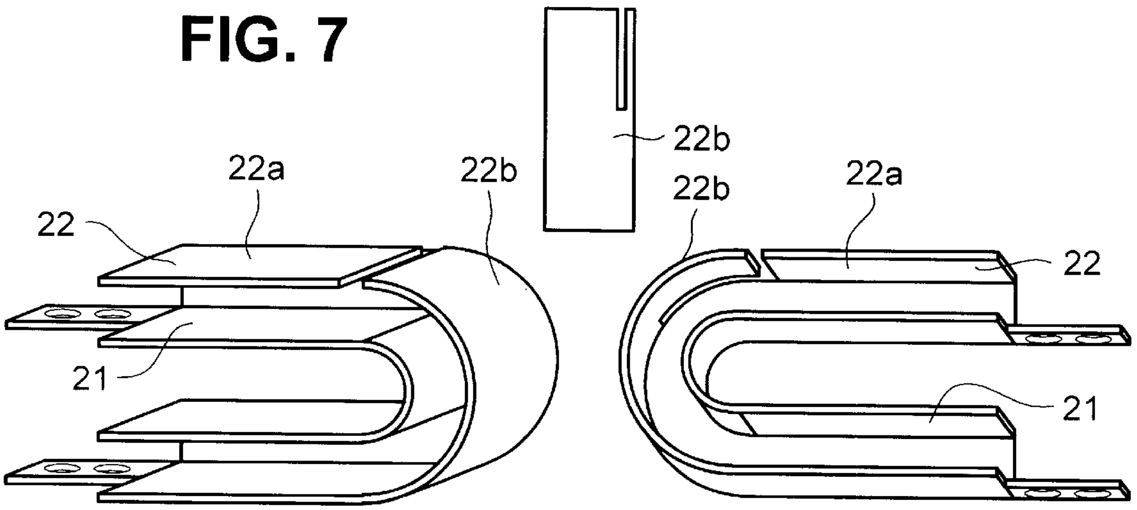
FIG. 7 is a view showing the structure of the terminal rail for a passenger conveyor according to the present invention.
Figure 8:
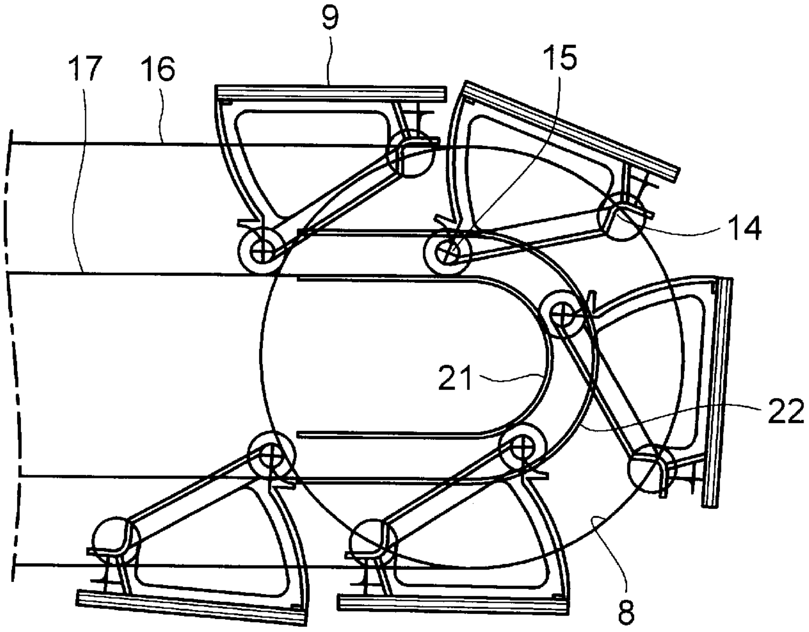
FIG. 8 is a view showing the engaging state of a terminal rail according to the present invention.
Figure 9:
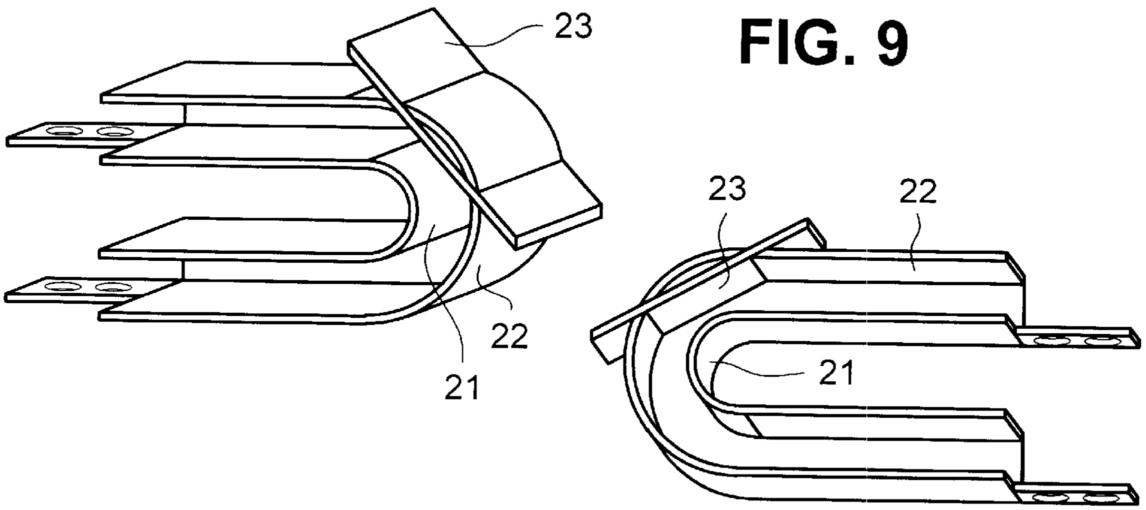
FIG. 9 is a view showing the path of a rear wheel roller of a step on a terminal rail when operating of the passenger conveyor incorporated with a terminal rail according to the present invention.

Referring to FIG. 7, one embodiment of the terminal rail for a passenger conveyor according to the present invention comprises an inner guide rail 21 and an outer guide rail 22. The structure of the terminal rail for the passenger conveyor for guiding a rear wheel roller of a step is characterized that the outer guide rail 22 against which the rear wheel roller 15 impacts comprises a slot formed along the longitudinal direction of the rail from a portion, at which the straight portion 22*a* of the outer wheel terminates, to a middle of a bending portion 22*b* of the outer wheel.

Figure 10:
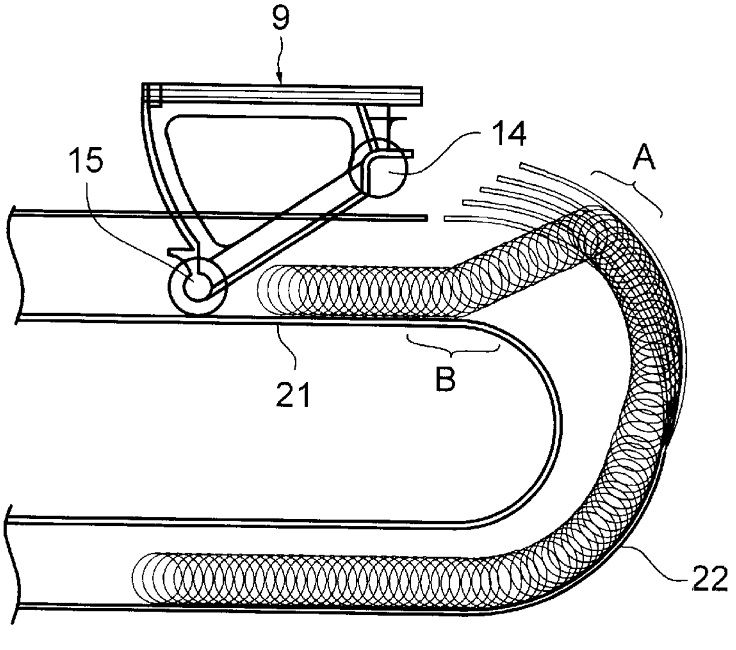
FIG. 10 is a view showing the structure of the terminal rail for a passenger conveyor according to a variant of the present invention.

Referring to FIG. 10, another embodiment of the terminal rail for a passenger conveyor according to the present invention comprises an inner guide rail 21 and an outer guide rail 22. The terminal rail shown in the figure comprises a leaf spring 23 on one side of the outer guide rail 22 to resiliently absorb the impact of the rear wheel roller 15 of the step. The provided leaf spring 23 can elastically absorb the impact load between the rear wheel roller of the step and the outer guide rail 22.

According to the embodiments as described above, the outer guide rail 22 has an impacting portion provided with a constant area and with a desired thickness to prevent it from being curved or bent on impacting against the rear wheel roller 18 of the step. It has to be noted that the outer guide rail 22 has the same curvature as in the conventional outer guide rail 19.

Preferably, the width of the inner and outer guide rails 21 and 22 is larger than the width of the rear wheel roller 15 of the step, and is determined to be in a predetermined range whereby interference with the circumferential components is prevented during operation of the conveyor.

The inner guide rail 21 is engaged to the end of the secondary rail 17, and the outer guide rail 22 is engaged to a lower rail.

The operation of the terminal rail for the passenger conveyor according to the present invention as constructed above will be described in detail.

The front wheel roller 14 of the step 9 engaged with the driving chains 10 travels along the primary rail 16, and the rear wheel roller 15 rotates along the secondary rail 17 on the terminal rail of the upper and lower portions of the conveyor. At that time, the terminal rail engaged to the upper and lower portions of the conveyor functions as a guide so as to enable the rear wheel roller 15 of the step to rotate in a constant trance.

FIG. 10 is a view showing the terminal rail for the passenger conveyor according to the present invention in operation, in which the moving path of the rear wheel roller 15 of the step is shown in a number of circles. The front wheel roller 14 of the step rotates along the periphery of the terminal gear 8, and the rear wheel roller 15 of the step rotates along the inner curved line of the terminal rail.

Specifically, at the time the step 9 rotates around the axis of the terminal gear 8, the rear wheel roller 15 of the step rolls over the inner guide rail 21 of the terminal rail and then impacts against the outer guide rail 22 acting as a damper. The outer guide rail 22 of the terminal rail moves smoothly by means of the resilient area for absorbing the impact. The resilient range of the outer guide rail 22 is determined in a manner that the outer guide rail 22 does not vibrate in a visually recognizable order, but is resiliently deformed with slight movement. Accordingly, during travelling of the step, the rear wheel roller 15 of the step does not deviate in any direction. The impact produced from the rear wheel roller 15 of the step as described above is sufficiently damped by the outer guide rail 22.

Thereafter, the rear wheel roller 15 of the step which has been damped at the outer guide rail 22 of the terminal rail travels along the inner surface of the outer guide rail 22.

The same effect as described above can be obtained if a leaf spring is provided between the end of the straight portion of the outer guide rail and the middle of the turning portion instead.

As described above, according to the terminal rail for the passenger conveyor of the present invention, when the rear wheel roller of the step impacts against the outer guide rail of the terminal rail, the outer guide rail of the terminal rail or the leaf spring functions as a damping device for damping the impact vibrations, thereby significantly reducing the noises. With the prevention of the vibrations due to the impact, the pulsating phenomenon of the step may also be prevented. Also, since the impact of the rear wheel roller of the step is reduced, the life of the rear wheel roller of the step and that of the terminal rail components can be extended.

While the present invention has been described and illustrated herein with reference to the preferred embodiments thereof, it will be understood by those skilled in the art that various changes in form and details may be made therein without departing from the spirit and scope of the invention.

What is claimed is:

1. A terminal rail for a passenger conveyor, comprising:

a straight rail for guiding a front wheel of a step platform of the passenger conveyor; and a terminal rail for guiding a rear wheel of the step platform, the terminal rail including inner and outer guide rails for guiding the rear wheel of the step platform therebetween, wherein said outer rail guide includes a bendingly deflectable portion where the rear wheel first contacts said outer rail guide, said portion being bendingly deflectable in a manner sufficient to absorb an impact of the rear wheel thereon.

2. The terminal rail according to claim 1, wherein said bendingly deflectable portion is a leaf spring provided on said outer rail guide.

3. The terminal rail according to claim 1, wherein said bendingly deflectable portion is a portion of said outer rail guide provided with a longitudinal slit extending therealong whereby said outer rail guide is made bendingly resilient.

4. The terminal rail according to claim 2, wherein a portion of said outer rail guide provided with a longitudinal slit extending therealong whereby said outer rail guide is made bendingly resilient.

* * * * *